(12) United States Patent
Dodoro et al.

(10) Patent No.: US 7,287,911 B2
(45) Date of Patent: Oct. 30, 2007

(54) BEARING DEVICE FOR SUPPORTING PINION SHAFT

(75) Inventors: Hirofumi Dodoro, Osaka (JP); Akiyuki Suzuki, Osaka (JP); Kanichi Kouda, Osaka (JP); Motoshi Kawamura, Osaka (JP); Kunihiko Yokota, Osaka (JP); Toshirou Fukuda, Osaka (JP)

(73) Assignee: JTEKT Corporation, Osaka (JP)

( * ) Notice: Subject to any disclaimer, the term of this patent is extended or adjusted under 35 U.S.C. 154(b) by 16 days.

(21) Appl. No.: 10/494,152

(22) PCT Filed: Nov. 8, 2002

(86) PCT No.: PCT/JP02/11656

§ 371 (c)(1),
(2), (4) Date: Apr. 29, 2004

(87) PCT Pub. No.: WO03/040578

PCT Pub. Date: May 15, 2003

(65) Prior Publication Data

US 2005/0031240 A1   Feb. 10, 2005

(30) Foreign Application Priority Data

| Nov. 8, 2001 | (JP) | ............................. 2001-343156 |
| Nov. 8, 2001 | (JP) | ............................. 2001-343157 |
| Dec. 4, 2001 | (JP) | ............................. 2001-369911 |

(51) Int. Cl.
*F16C 19/49* (2006.01)

(52) U.S. Cl. .................................................... 384/517

(58) Field of Classification Search ................ 384/517, 384/518, 563, 512, 537
See application file for complete search history.

(56) References Cited

U.S. PATENT DOCUMENTS

| 3,792,625 A | 2/1974 | Asberg |
| 5,492,419 A | 2/1996 | Miller et al. |

FOREIGN PATENT DOCUMENTS

| JP | 10-9259 | 1/1998 |
| JP | 2000-2239 | 1/2000 |
| WO | WO 00/12916 | 3/2000 |

*Primary Examiner*—Lenard A. Footland
(74) *Attorney, Agent, or Firm*—Jordan and Hamburg LLP (57) ABSTRACT

The present invention relates to a bearing device for supporting a pinion shaft so as to freely rotate with respect to a case. The bearing device comprises a first tilt-contact rolling bearing provided on the connecting-flange-side outer peripheral surface of the pinion shaft and a second tilt-contact rolling bearing formed from an angular ball bearing provided on the pinion-gear-side outer peripheral surface of the pinion shaft, wherein lines of action of the first and second tilt-contact rolling bearings intersect with one another on an outer diameter side, the connecting-flange-side end portion of the first tilt-contact rolling bearing and the pinion-gear-side end portion of the second tilt-contact rolling bearing are respectively sealed with seal members, a sealed space between the seal members is infilled with grease, and the connecting flange is fastened in the pinion-gear direction to thereby preload the first and second tilt-contact rolling bearings.

6 Claims, 10 Drawing Sheets

BEARING DEVICE FOR SUPPORTING PINION SHAFT

TECHNICAL FIELD

The present invention relates to a bearing device for supporting a pinion shaft so as to freely rotate, more particularly to a bearing device for supporting a pinion shaft comprised of a pair of tilt-contact rolling bearings installed in axial proximity and lubricated with grease.

BACKGROUND ART

Figure 12:
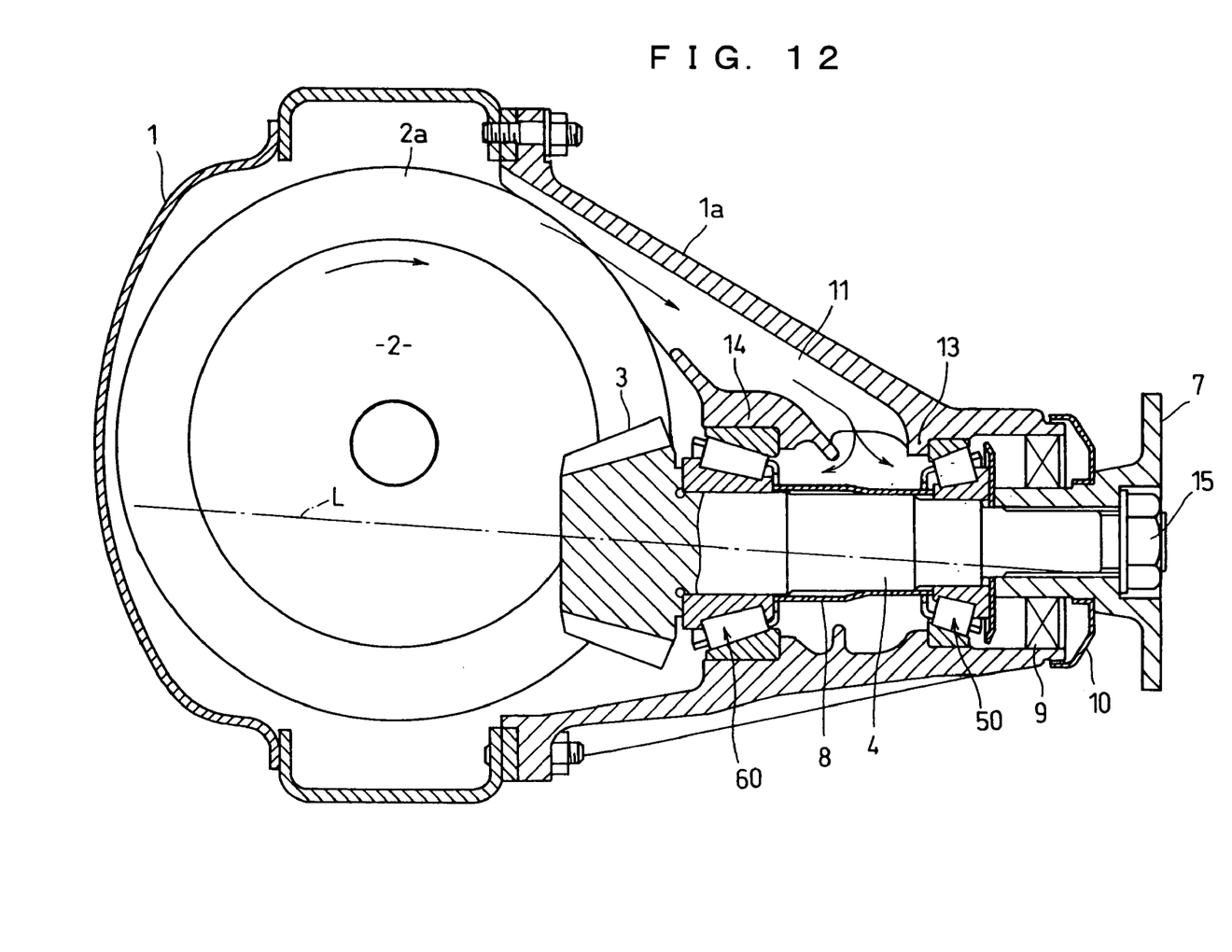
FIG. 12 is a sectional view of a conventional differential device.

The structure of a conventional differential device is shown in FIG. 12.

In FIG. 12 is shown a differential speed change mechanism 2 for differentially gearing right and left wheels, a pinion gear 3, a pinion shaft 4, and tapered roller bearings 50 and 60 for supporting the pinion shaft 4 so as to freely rotate, which are housed in a differential case 1. The pinion gear 3 is engaged with a ring gear 2a of the differential speed change mechanism 2 and is integral with the pinion shaft 4 at the inner end portion thereof. The pinion shaft 4 is supported, so as to freely rotate, on the inner side of the differential case 1 by the single row tapered roller bearings 50 and 60 of rear-surface-coupling type. At the outer end portion of the pinion shaft 4 is provided a companion flange 7, with which a propeller shaft (not shown) is coupled.

The tapered roller bearings 50 and 60 are respectively mounted to the inner peripheral surfaces of bearing-mounting annular walls 13 and 14 formed in a forged bearing case portion 1a of the differential case 1. The companion-flange-side tapered roller bearings 50 are installed from a small-diameter-side opening portion of the bearing case portion 1a. The pinion-gear-side tapered roller bearings 60 are installed from a large-diameter-side opening portion of the bearing case portion 1a. Spacers 8 for positioning are interposed between the tapered roller bearings 50 and 60. The tapered roller bearings 50 and 60 are fixed by screwing a nut 15 into the outer end portion of the pinion shaft 4 and fastening it into the companion flange 7, thereby applying a sufficient preload between the pinion gear 3 and the companion flange 7.

Lubrication oil is stored in the differential case 1 at a level L in the non-operating condition. The oil is splashed in response to the rotation of the gear ring 2a during operation, guided to the tapered roller bearings 50 and 60 through an oil introducing path 11 formed between the annular walls 13 and 14 in the bearing case portion 1a, and returned through an oil reflux path (not shown). Between the outer peripheral surface of the pinion shaft 4 on the outer end portion side thereof and the inner peripheral surface of the bearing case portion 1a are mounted oil seals 9 for preventing oil leakage, and further seal protection cups 10 for concealing the oil seals 9.

In the case of the conventional differential devices, a large frictional resistance resulting from a large thrust load acts on the pinion-gear-side tapered roller bearings 60. This leads to a larger rotational torque, which results in lowered efficiency of the differential device. Other drawbacks are: torque, on account of using oil for lubrication, increases due to a resistance caused by the agitated oil, it becomes necessary to provide the oil introducing path 11 and the oil reflux path in the differential case 1 resulting in the differential device of a larger size, and the bearing device, under the influence from foreign matter in the oil, undergoes a shortened life and requires maintenance.

Therefore, a main object of the present invention is to provide a bearing device for supporting a pinion shaft capable of reducing running torque to improve the efficiency of the device, suppressing the increase of the torque due to a resistance caused by agitated oil, reducing the device in size and weight, and improving the life of the bearing.

DISCLOSURE OF THE INVENTION

The present invention relates to a bearing device for supporting a pinion shaft, wherein a pinion gear is provided on one end side and a connecting flange on another end side, so as to freely rotate with respect to a case. The bearing device has a first tilt-contact rolling bearing provided on the connecting-flange-side outer peripheral surface of the pinion shaft and a second tilt-contact rolling bearing comprising an angular ball bearing provided on the pinion-gear-side outer peripheral surface of the pinion shaft. In the bearing device, the lines of action of the first and second tilt-contact rolling bearings intersect with one another on an outer diameter side; the connecting-flange-side end portion of the first tilt-contact rolling bearing and the pinion-gear-side end portion of the second tilt-contact rolling bearing are respectively sealed with seal members; the sealed space between the seal members is infilled with grease; and the connecting flange is fastened in the pinion-gear direction thereby applying a preload to the first and second tilt-contact rolling bearings.

The bearing device for supporting a pinion shaft according to the present invention is applied to a differential device, transfer device or the like. When applied to, for example, a differential device, the connecting flange constitutes a companion flange coupled with a propeller shaft, and when applied to a transfer device, the connecting flange constitutes an output flange coupled with a rear wheel differential.

As the first tilt-contact rolling bearing is employed a tandem angular ball bearing having connecting-flange-side single or double rows of balls disposed radially outward or various types of tilt-contact rolling bearings such as a tapered roller bearing, or the like.

As the second tilt-contact rolling bearing is employed a tandem angular ball bearing having pinion-gear-side single or double rows of balls disposed radially outward, or the like.

PREFERRED EMBODIMENT OF THE INVENTION

Figure 1:
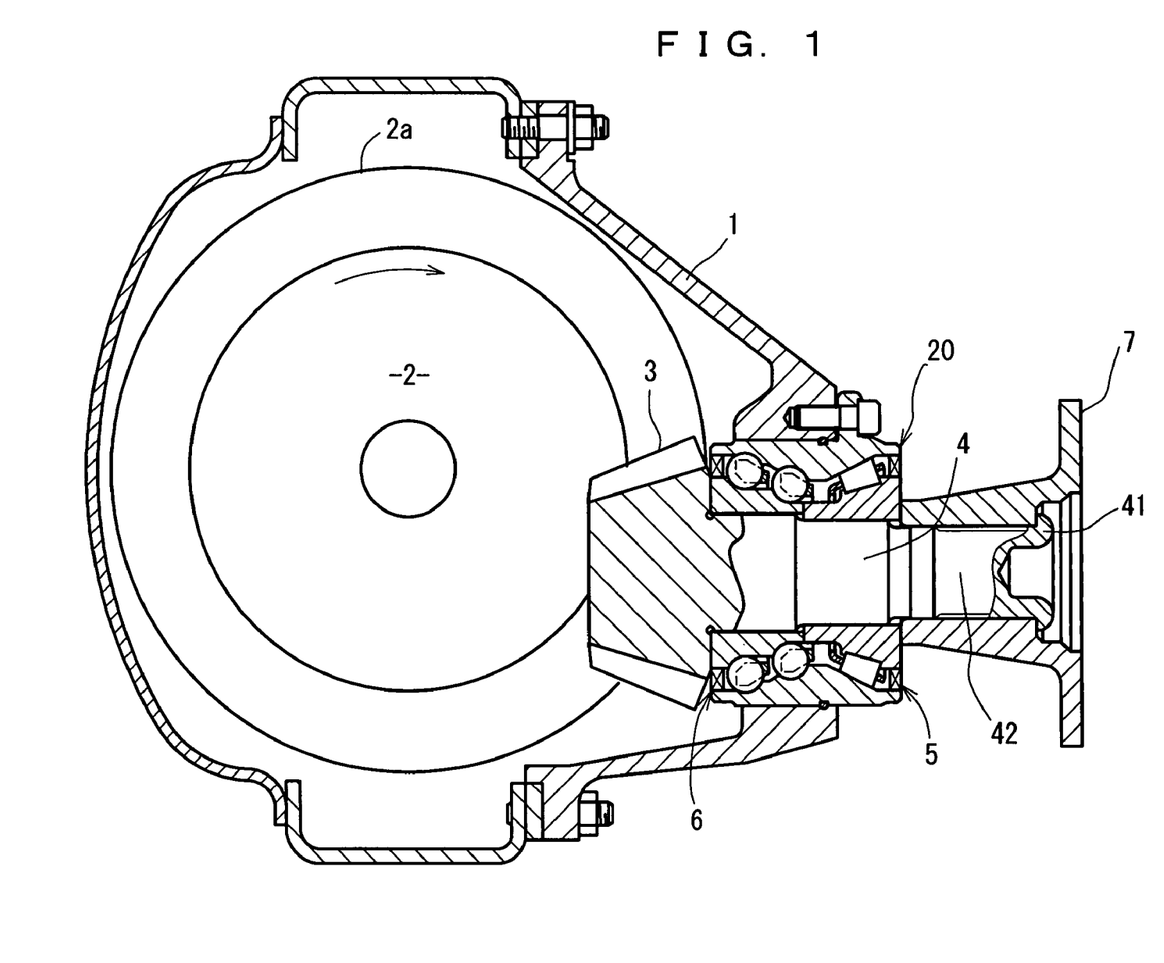
FIG. 1 is a sectional view of a differential device having a bearing device for supporting a pinion shaft adopted therein according to a preferred embodiment of the present invention.
Figure 2:
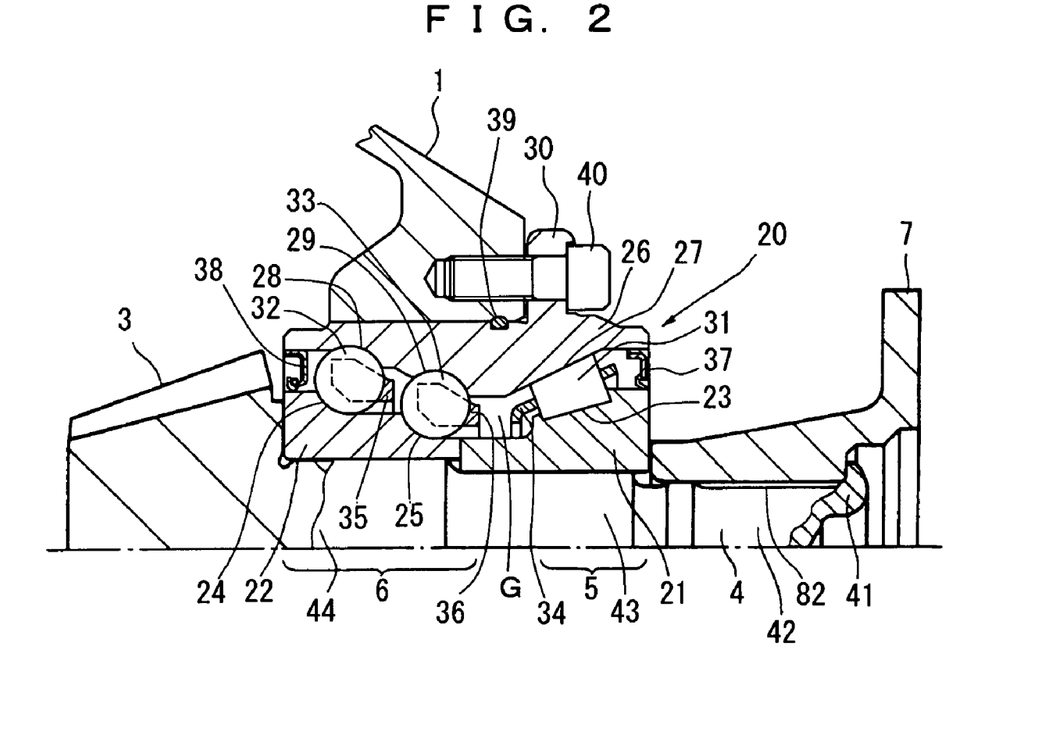
FIG. 2 is a partial sectional view of the bearing device for supporting a pinion shaft of FIG. 1.
Figure 3A:
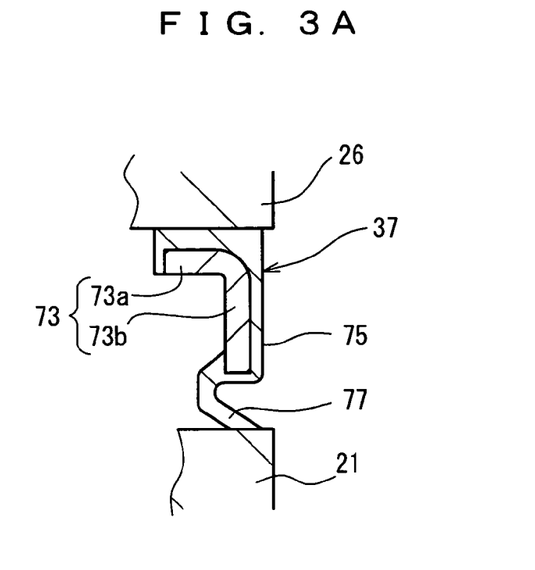
FIG. 3 is an enlarged sectional view of sealed portions in the bearing device for supporting a pinion shaft of FIG. 1.
Figure 3B:
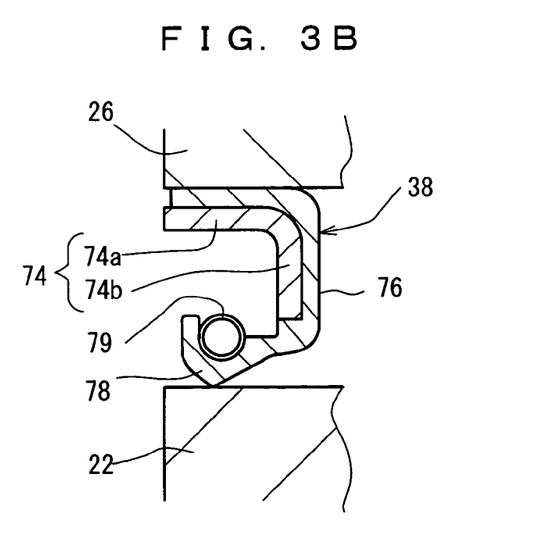

Referring to FIGS. 1 through 3, a bearing device for supporting a pinion shaft according to a preferred embodiment of the present invention is hereinafter described. FIG. 1 shows a sectional view of a differential device having a bearing device for supporting a pinion shaft adopted therein. FIG. 2 shows a partial sectional view of the bearing device for supporting a pinion shaft. FIGS. 3A and 3B show an enlarged sectional view of sealed portions in the bearing device for supporting a pinion shaft. 1 is a differential case, 2 is a differential speed change mechanism for differentially gearing right and left wheels, 3 is a pinion gear engaged with a ring gear 2a of the differential speed change mechanism 2, 4 is a pinion shaft integral with the pinion gear 3, and 20 is a bearing unit for supporting the pinion shaft 4 so as to freely rotate with respect to the differential case 1.

The bearing unit 20 comprises a first tilt-contact rolling bearing 5 formed from a companion-flange-side single row tapered roller bearing and a second tilt-contact rolling bearing 6 formed from a pinion-gear-side tandem double row angular ball bearing. More specifically, the first tilt-contact rolling bearing 5 comprises an inner ring 21, an outer ring 26, a group of tapered rollers 31, and a retainer 34. The second tilt-contact rolling bearing 6 comprises an inner ring 22, the outer ring 26, groups of balls 32 and 33, and retainers 35 and 36. The inner rings 21 and 22 axially abutted against one another and the single outer ring 26 is made up into a unit. The lines of action of the group of tapered rollers 31 and the groups of balls 32 and 33 intersect one another on the outer ring side, and the first and second tilt-contact rolling bearings 5 and 6 form a rolling bearing of rear-surface-coupling type.

The inner ring 22 is disposed radially outward relative to the inner ring 21. Raceways 23, 24 and 25 are respectively formed on the outer peripheral surfaces of the inner rings 21 and 22. The pinion-gear-side raceway 24 of the inner ring 22 is located radially outward relative to the raceway 25. On the inner peripheral surface of the outer ring 26 are formed raceways 27, 28 and 29 opposite to the raceways 23, 24 and 25, and on the companion-flange-side outer peripheral surface thereof is provided a flange 30 for fixing in the protruding condition.

The group of tapered rollers 31 and the groups of balls 32 and 33 respectively retained by retainers 34, 35 and 36 are disposed along the raceways 23, 24 and 25 of the inner rings 21 and 22 and the raceways 27, 28 and 29 of the outer ring 26. Both of the axial ends of the bearing unit 20 are sealed with seal members 37 and 38, and the sealed space formed by the seal members 37 and 38 between the inner and outer rings is infilled with a grease G. In the case of this bearing unit 20, the raceway 24 of the inner ring 22 is located radially outward relative to the raceway 25 and is thereby lengthened so that the number of the pinion-gear-side balls 32 is increased.

A so-called bearing seal is used as the seal member 37 disposed on the companion flange side (FIG. 3A), and a so-called oil seal is used as the seal member 38 disposed on the pinion gear side (FIG. 3B).

The seal members 37 and 38 are respectively formed by curing elastic bodies 75 and 76 to thereby bond them on annular cored bars 73 and 74. The annular cored bars 73 and 74 are formed in the shape that annular plate portions 73b and 74b extending radially inward are provided on one axial end of cylindrical portions 73a and 74a. The elastic bodies 75 and 76 have a coating portion (reference symbol thereof omitted) covering the outer peripheries of the cylindrical portions 73a and 74a of the annular cored bars 73 and 74 through to one side of the annular plate portions 73b and 74b and lip portions 77 and 78 protruding toward the inner peripheries of the annular plate portions 73b and 74b. The lip portion 77 is mounted so as to mainly prevent the penetration of muddy water and foreign matter coming from outside of the bearing, and the lip portion 78 so as to mainly prevent the inpour of gear oil.

Both of the seal members 37 and 38 are fixed by having the cylindrical portions 73a and 74a of the annular cored bars 73 and 74 respectively pressure-fitted to the outer ring 26 via the coating portion of the elastic bodies 75 and 76. With the seal members 37 and 38 being respectively fixed as described, the lip portions 77 and 78 are arranged to be respectively in contact with the shoulder portions of the inner rings 21 and 22 of high cylindricity so that an appropriate binding force is continuously maintained therebetween.

The seal member 38 is arranged to enhance the sealing capability thereof to the maximum extent possible by having the lip portion 78 forcibly pressed onto the inner ring 22 by means of a spring ring 79. Thus, the gear oil in the differential case 1 is most surely prevented from penetrating into the inside of the bearing.

In the case of the seal member 37 having no spring ring provided therefor, the inner diameter of the lip portion 77 is simply reduced to be smaller by a predetermined extent than the outer diameter of the shoulder portion of the inner ring 21. Then, the lip portion 77, with the diameter thereof elastically enlarged in response to the dimensional difference, is arranged to be in contact with the inner ring 21. Alternatively, a ventilation hole running through the inside and outside of the bearing may be formed in the seal member 37 to prevent the adsorption of the lip portion 77 to the outer diameter of the shoulder portion of the inner ring 21 caused by a difference in pressures inside and outside of the bearing.

Because the elastic bodies 75 and 76 of the seal members 37 and 38 may be exposed to the temperatures of 130° C.-150° C., acrylic rubber, heat-resistant acrylic rubber, or the like is preferably used as the material thereof. The heat-resistant acrylic rubber is an ethylene-acrylic rubber in which ethylene and acrylic acid ester are combined as the main components of the copolymer composition. Referring to the grease G for infilling the inside of the bearing device, diurea-based grease or ester-based grease which is compatible with gear oil, is preferably used in terms of heat-resistance as well. More specifically, a product called KNG170 of NIPPON GREASE Co., Ltd. or a product called Multemp SRL of KYODO YUSHI CO., LTD., for example, is suitably used as the grease. For KNG170, poly α olefin mineral oil is used as base oil and diurea as thickener, and the operating temperature range thereof is −30° C. to 150° C. For Multemp SRL, ester is used as base oil and lithium soap as thickener, and the operating temperature range thereof is −40° C. to 130° C.

An accurate preload adjustment is applied to the bearing unit 20 because the inner rings 21 and 22, the outer ring 26, the group of tapered rollers 31 and the groups of balls 32 and 33 retained by the retainers 34, 35 and 36 are incorporated therein in the manufacturing step.

The pinion shaft 4 is formed from a small diameter portion 42, a medium diameter portion 43 and a large diameter portion 44, the outer diameter dimensions of which become larger toward the pinion gear 3 side.

The bearing unit 20 is pressure-fitted into the pinion shaft 4 from a drive shaft side, the inner ring 22 is fitted outward to the large diameter portion 44 of the pinion shaft 4, and the inner ring 21 is fitted outward to the medium diameter portion 43. The flange 30 of the outer ring 26 is abutted against the outer surface of the differential case 1, and a bolt 40 is inserted through the flange 30 to be fastened to the differential case 1.

Furthermore, the companion flange 7 is spline-fitted to the small diameter portion 42 of the pinion shaft 4, and the drive-shaft-side end portion of the pinion shaft 4 is deformed radially outward to be caulked to the companion flange 7. The caulking 41 has the bearing unit 20 sandwiched between the pinion gear 3 and the companion flange 7, and the bearing unit 20 is thereby preloaded and fixed.

A packing 39 is provided between the outer ring 26 and the differential case 1 to prevent the leakage of oil in the differential device.

In the bearing device for supporting a pinion shaft of this embodiment, an angular ball bearing of minor frictional resistance is used for the pinion-gear-side second tilt-contact rolling bearing 6 on which a large thrust load acts. For that reason, running torque is reduced compared to the case of a tapered roller bearing, and the efficiency of the differential device thereby improves.

Use of a double row angular ball bearing for the second tilt-contact rolling bearing 6 increases the load capacity due to sufficient supporting rigidity of the ball bearing. Moreover, the second tilt-contact rolling bearing 6 is disposed radially outward relative to the first tilt-contact rolling bearing 5 and has a tandem structure, wherein the pinion-gear-side group of balls 32 are disposed radially outward relative to the other group of balls 33. Accordingly, the number of the pinion-gear-side balls 32, which is affected by a larger thrust load, is increased, and a pinion-gear-side load capacity, which is affected by a larger thrust load, is further increased. Therefore, a sufficient load capacity can be obtained despite the reduced running torque.

Because the bearing unit 20 is designed to be lubricated with grease, wherein both of the axial ends are sealed with the seal members 37 and 38, it is unnecessary to provide oil introducing or oil reflux paths in the differential case 1, in contrast to the conventional oil lubrication. Therefore, a differential device is favorably reduced in size and weight. Because the bearing unit 20 cannot be affected by foreign matter in oil in the differential device, improved bearing life is achieved and no maintenance is required.

The bearing, which supports the pinion shaft 4 so as to freely rotate with respect to the differential case 1, is made up into a unit by means of the outer ring 26 so that an accurate preload adjustment can be executed in the manufacturing step of the bearing unit 20. This eliminates the need to adjust the preload when the differential device is assembled, which reduces the manufacturing working steps leading to more efficient assembly. Further, because the tapered roller bearing is used for the first tilt-contact rolling bearing 5, it becomes easier to set the preload compared to the case of a ball bearing.

The companion flange 7 is fastened by means of the caulking 41, which eliminates the step of fastening screws on the pinion shaft 4, reducing the cost for working steps and the weight.

The diameter of the pinion shaft 4 is reduced toward the companion flange 7 side, the bearing unit 20 is fitted outward to the pinion shaft 4 from the drive shaft side, and the flange 30 is fixed to the outer surface of the differential case 1 by the bolt 40. In such a formation, it is unnecessary to cover the bearing unit 20 with the differential case 1, which reduces the size of the differential case 1.

It may be possible to effect cost reduction by forming the inner ring of the first tilt-contact rolling bearing 5 integral with the companion flange 7 or forming the inner ring of the second tilt-contact rolling bearing 6 integral with the pinion shaft 4 to reduce the number of parts. The respective rows of balls in the second tilt-contact rolling bearing 6 may not necessarily have a tandem structure, and may be circumferentially disposed at an identical radial dimension. An angular ball bearing having single row or at least three rows may be used for the second tilt-contact rolling bearing 6. Fastening does not necessarily require the caulking 41, which may be replaced by a nut.

OTHER EMBODIMENTS OF THE INVENTION

Figure 4:
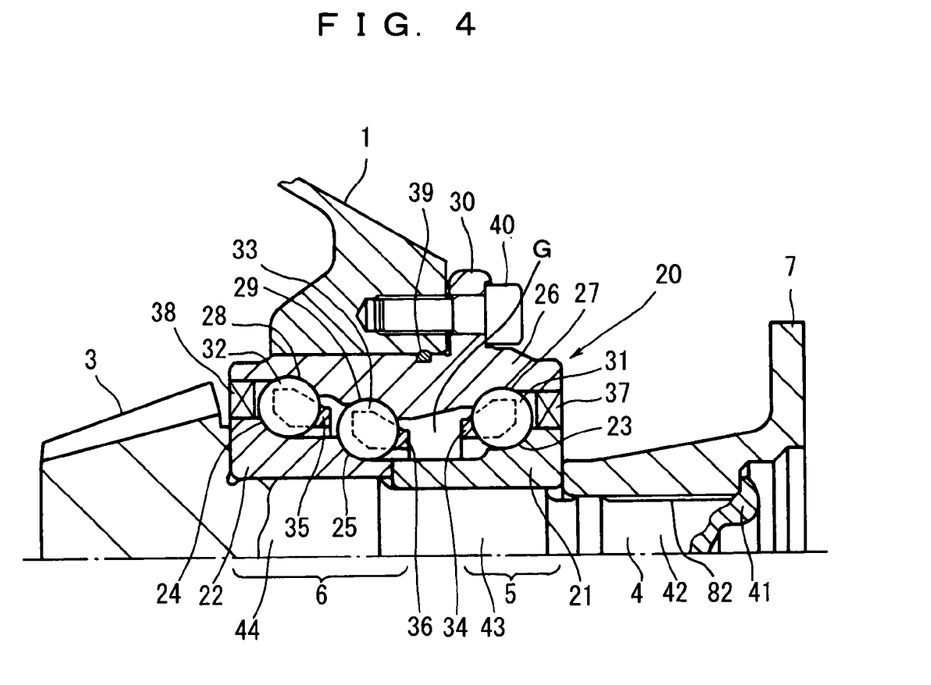
FIG. 4 is a partial sectional view of a bearing device for supporting a pinion shaft in a differential device according to another embodiment of the present invention.

1) Referring to FIG. 4, another embodiment of the present invention is hereinafter described. FIG. 4 shows a partial sectional view of a bearing device for supporting a pinion shaft adopted in a differential device.

1 is a differential case, 3 is a pinion gear engaged with a ring gear (not shown) of a differential speed change mechanism, 4 is a pinion shaft formed integral with the pinion gear 3, and 20 is a bearing unit for supporting the pinion shaft 4 so as to freely rotate with respect to the differential case 1.

The bearing unit 20 comprises a first tilt-contact rolling bearing 5 and second tilt-contact rolling bearing 6. The first tilt-contact rolling bearing 5 is formed from a companion-flange-side single row angular ball bearing. The second tilt-contact rolling bearing 6 is formed from a pinion-gear-side double row angular ball bearing of tandem structure.

The first tilt-contact rolling bearing 5 is comprised of an inner ring 21, an outer ring 26, a group of balls 31 and a retainer 34. The second tilt-contact rolling bearing 6 is comprised of an inner ring 22, the outer ring 26, groups of balls 32 and 33 arranged axially in two rows and retainers 35 and 36. The inner rings 21 and 22 axially abutted against one another and the single outer ring 26 are made up into a unit. The lines of action of the group of balls 31 and the groups of balls 32 and 33 intersect one another on the outer ring side, and the first and second tilt-contact rolling bearings 5 and 6 form the rolling bearing of rear-surface-coupling type.

The inner ring 22 is disposed radially outward relative to the inner ring 21. Raceways 23, 24 and 25 are respectively formed on the outer peripheral surfaces of the inner rings 21 and 22. The pinion-gear-side raceway 24 of the inner ring 22 is disposed radially outward relative to the other raceway 25. On the inner peripheral surface of the outer ring 26 are formed raceways 27, 28 and 29 opposite to the raceways 23, 24 and 25, and on the companion-flange-side outer peripheral surface of the outer ring 26 is provided a flange 30 for fixing in the protruding condition.

The groups of balls 31, 32 and 33 respectively retained by the retainers 34, 35 and 36 are disposed along the raceways 23, 24 and 25 of the inner rings 21 and 22 and the raceways 27, 28 and 29 of the outer ring 26. Both of the axial ends of the bearing unit 20 are sealed with seal members 37 and 38, and the sealed space by the seal members 37 and 38 between the inner and outer rings is infilled with a grease G. In the case of this bearing unit 20, the raceway 24 of the inner ring 22 is located radially outward relative to the raceway 25 and lengthened to thereby increase the number of the pinion-gear-side balls 32.

The seal member 37 is formed as shown in FIG. 3A, and the seal member 38 is formed as shown in FIG. 3B. The grease exemplified in the embodiment of FIGS. 1 through 3, or the like, is used as the grease G.

An accurate preload adjustment is applied to the bearing unit 20 because the inner rings 21 and 22, the outer ring 26, and the groups of balls 31, 32 and 33 retained by the retainers 34, 35 and 36 retained by the retainers 34, 35 and 36 are incorporated therein in the manufacturing step.

The pinion shaft 4 is formed from a small diameter portion 42, a medium diameter portion 43 and a large diameter portion 44, which become larger in the outer diameter dimension toward the pinion gear 3 side.

The bearing unit 20 is pressure-fitted into the pinion shaft 4 from a drive shaft side, the inner ring 22 is fitted outward to the large diameter portion 44 of the pinion shaft 4, and the inner ring 21 is fitted outward to the medium diameter portion 43. The flange 30 of the outer ring 26 is abutted against the outer surface of the differential case 1, and a bolt 40 is inserted through the flange 30 to be fastened to the differential case 1.

Furthermore, the companion flange 7 is spline-fitted to the small diameter portion 42 of the pinion shaft 4, and the drive-shaft-side end portion of the pinion shaft 4 is deformed radially outward to be caulked to the companion flange 7. The caulking 41 has the bearing unit 20 sandwiched between the pinion gear 3 and the companion flange 7, and the bearing unit 20 is thereby preloaded and fixed.

A packing 39 is provided between the outer ring 26 and the differential case 1 to prevent the leakage of oil in the differential device.

The bearing device for supporting a pinion shaft of this embodiment achieves an effect similar to that cited in the embodiment shown in FIGS. 1 through 3.

Moreover, because a single row angular ball bearing of small frictional resistance is used for the first tilt-contact rolling bearing 5, a running torque is further reduced to consequently improve the efficiency of the differential device.

The bearing unit 20 is comprised of the first and second tilt-contact rolling bearings 5 and 6 formed from the angular ball bearings, which eliminates the need to widen a space between bearings to reduce a running torque as in the case of a tapered roller bearing. This allows the axial length to be reduced achieving a downsized differential device.

The bearing unit 20 is fixed by having the flange 30 bolt-fastened to the outer surface of the differential case 1. The first tilt-contact rolling bearing 5 is not covered by the differential case 1. Therefore, the inner ring 21 and the outer ring 26 of the first tilt-contact rolling bearing 5 are arranged to protrude radially outward so that the diameters of the raceways 23 and 27 are enlarged to thereby increase the number of the group of balls 31 and achieve a larger load capacity.

The respective groups of balls in the second tilt-contact rolling bearing 6 may not have a tandem structure, and may be circumferentially disposed at an identical radial dimension. An angular ball bearing of single or at least three rows may be used for the second tilt-contact rolling bearing 6. A double row angular ball bearing of tandem structure may be used for the first tilt-contact rolling bearing 5. Fastening does not necessarily require the caulking 41, which may be replaced by a nut.

Figure 5:
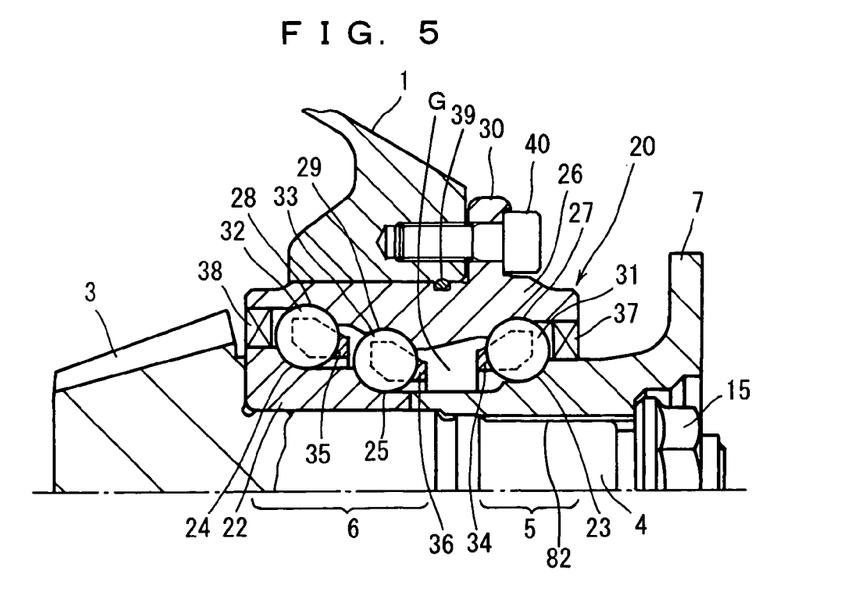
FIG. 5 is a partial sectional view of a bearing device for supporting a pinion shaft in a differential device according to still another embodiment of the present invention.

2) Referring to FIG. 5, still another embodiment of the present invention is hereinafter described. FIG. 5 shows a partial sectional view of a bearing device for supporting a pinion shaft adopted in a differential device. For any part identical to those in FIG. 4, the same reference numerals are shown to omit explanations.

The inner ring of a first tilt-contact rolling bearing 5 in a bearing unit 20 is formed integral with a companion flange 7.

A raceway 23 is formed on the outer peripheral surface of the companion flange 7. The first tilt-contact rolling bearing 5 is comprised of the companion flange 7, an outer ring 26, and a group of balls 31 retained by a retainer 34. The second tilt-contact rolling bearing 6 has the same structure as in the embodiment shown in FIG. 4.

In the assembly steps for the bearing unit 20, the inner ring 22 is pressure-fitted into the pinion shaft 4 from a drive shaft side, the flange 30 of the outer ring 26 is abutted against the outer surface of the differential case 1 and is fastened by a bolt 40, the companion flange 7 is spline-fitted to the pinion shaft 4, a nut 15 is fastened into the drive-shaft-side end portion of the pinion shaft 4, and the bearing unit 20 is thereby preloaded and fixed.

The bearing device for supporting a pinion shaft of this embodiment achieves an effect similar to that cited in the embodiment shown in FIG. 4.

Moreover, the companion flange 7 also serves as the inner ring of the first tilt-contact rolling bearing 5, thus achieving a reduced number of parts and thus a reduced cost.

Having the companion flange 7 also serve as the inner ring of the first tilt-contact rolling bearing 5, a sufficient length of a spline 82 required for the communication of a running torque is ensured despite a shortened length of the companion flange 7. Thus, the differential device is further reduced in size and weight.

The respective rows of balls of the second tilt-contact rolling bearing 6 may not have a tandem structure, and may be circumferentially disposed at an identical radial dimension. An angular ball bearing of single or at least three rows may be used for the second tilt-contact rolling bearing 6. A double row angular ball bearing of tandem structure may be used for the first tilt-contact rolling bearing 5. Fastening does not necessarily require the caulking 41, which may be replaced by a nut.

Figure 6:
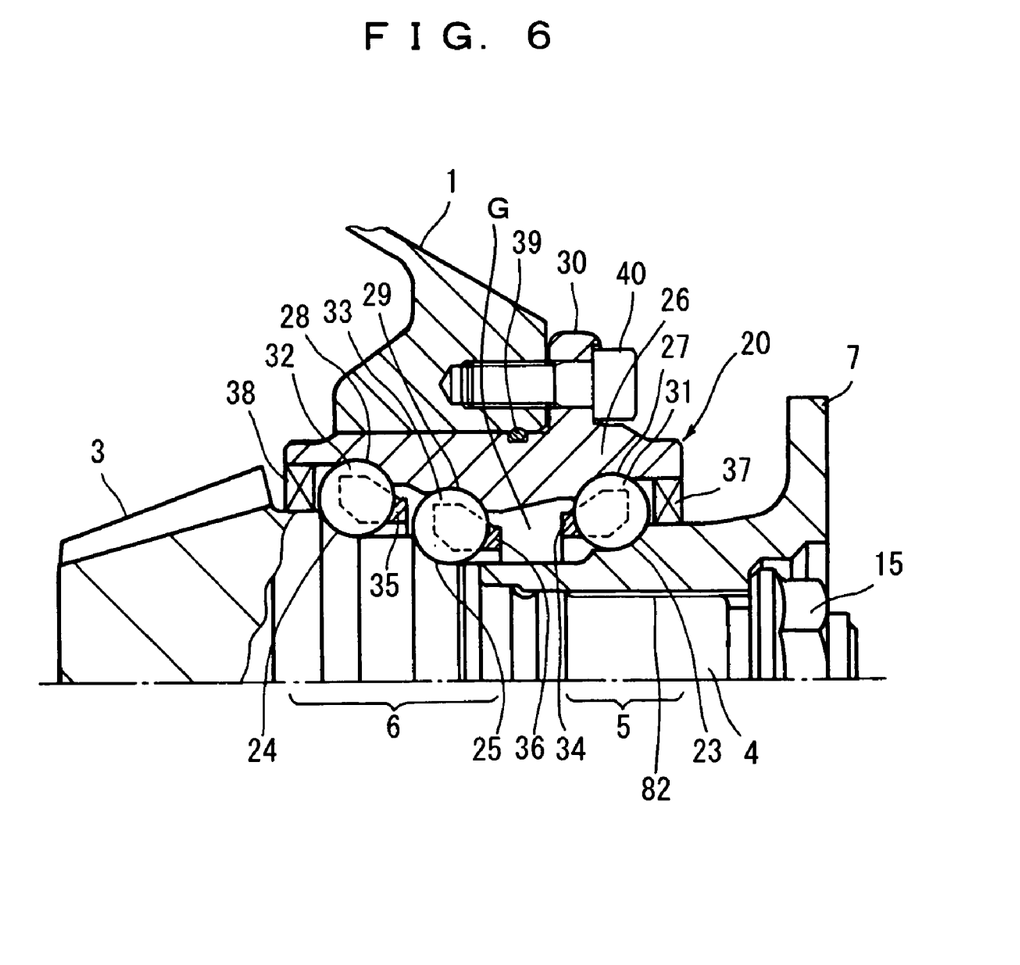
FIG. 6 is a partial sectional view of a bearing device for supporting a pinion shaft in a differential device according to still another embodiment of the present invention.

3) Referring to FIG. 6, still another embodiment of the present invention is hereinafter described. FIG. 6 shows a partial sectional view of a bearing device for supporting a pinion shaft adopted in a differential device. For any part identical to those in FIG. 4, the same reference numerals are shown to omit explanations.

The inner ring of a first tilt-contact rolling bearing 5 in a bearing unit 20 is formed integral with a companion flange 7. The inner ring of a second tilt-contact rolling bearing 6 is formed integral with a pinion shaft 4.

A raceway 23 is formed on the outer peripheral surface of the companion flange 7. The first tilt-contact rolling bearing 5 is comprised of the companion flange 7, an outer ring 26, and a group of balls 31 retained by a retainer 34. On the outer peripheral surface of the pinion shaft 4 are formed a pair of raceways 24 and 25, the diameters of which are enlarged on the pinion-gear-side. The second tilt-contact rolling bearing 6 is comprised of the pinion shaft 4, the outer ring 26 and groups of balls 32 and 33 retained by retainers 35 and 36.

In the assembly steps of the bearing unit 20, the groups of balls 32 and 33 are mounted along the raceways 24 and 25 of the pinion shaft 4 from a drive shaft side, the flange 30 of the outer ring 26 is abutted against the outer surface of the differential case 1 and is fastened by a bolt 40, the companion flange 7 is spline-fitted to the pinion shaft 4, a nut 15 is fastened into the drive-shaft-side end portion of the pinion shaft 4, and the bearing unit 20 is thereby preloaded and fixed.

The bearing device for supporting a pinion shaft of this embodiment achieves an effect similar to that cited in the embodiment shown in FIG. 4.

Further, the inner ring of the first tilt-contact rolling bearing 5 and the companion flange 7, and the inner ring of the second tilt-contact rolling bearing 6 and the pinion shaft 4, are respectively formed as a unit, thus achieving a reduced number of parts and thereby a reduced cost.

Having the companion flange 7 also serve as the inner ring of the first tilt-contact rolling bearing 5, a sufficient length of a spline 82 required for the communication of a running torque is ensured despite the shortened length of the companion flange 7. Thus, the differential device is further reduced in size and weight.

The inner ring of the second tilt-contact rolling bearing 6 is formed integral with the pinion shaft 4, in consequence of which the inner ring can be dispensed with. This results in a larger diameter of the pinion shaft 4 and an improved strength thereof is thereby achieved. Moreover, if the inner ring were not integral with the pinion shaft 4 there could be irregularities in the space between the inner ring raceway and the groups of ball bearings 32 and 33, impeding rolling of the bearings along the raceway, resulting from tolerance of the inner ring. Hence, the rigidity is improved, improving life of the bearing.

Another possible structure is that the inner ring of the second tilt-contact rolling bearing 6 is formed integral with the pinion shaft 4 and the inner ring of the first tilt-contact rolling bearing 5 is, as shown in FIG. 4, formed separate from the companion flange 7.

The respective rows of the second tilt-contact rolling bearing 6 may not have a tandem structure, and may be circumferentially disposed at an identical radial dimension. An angular ball bearing of single or at least three rows may be used for the second tilt-contact rolling bearing 6, and a double row angular ball bearing of tandem structure may be used for the first tilt-contact rolling bearing 5. Fastening does not necessarily require a caulking 41, which may be replaced by a nut.

Figure 7:
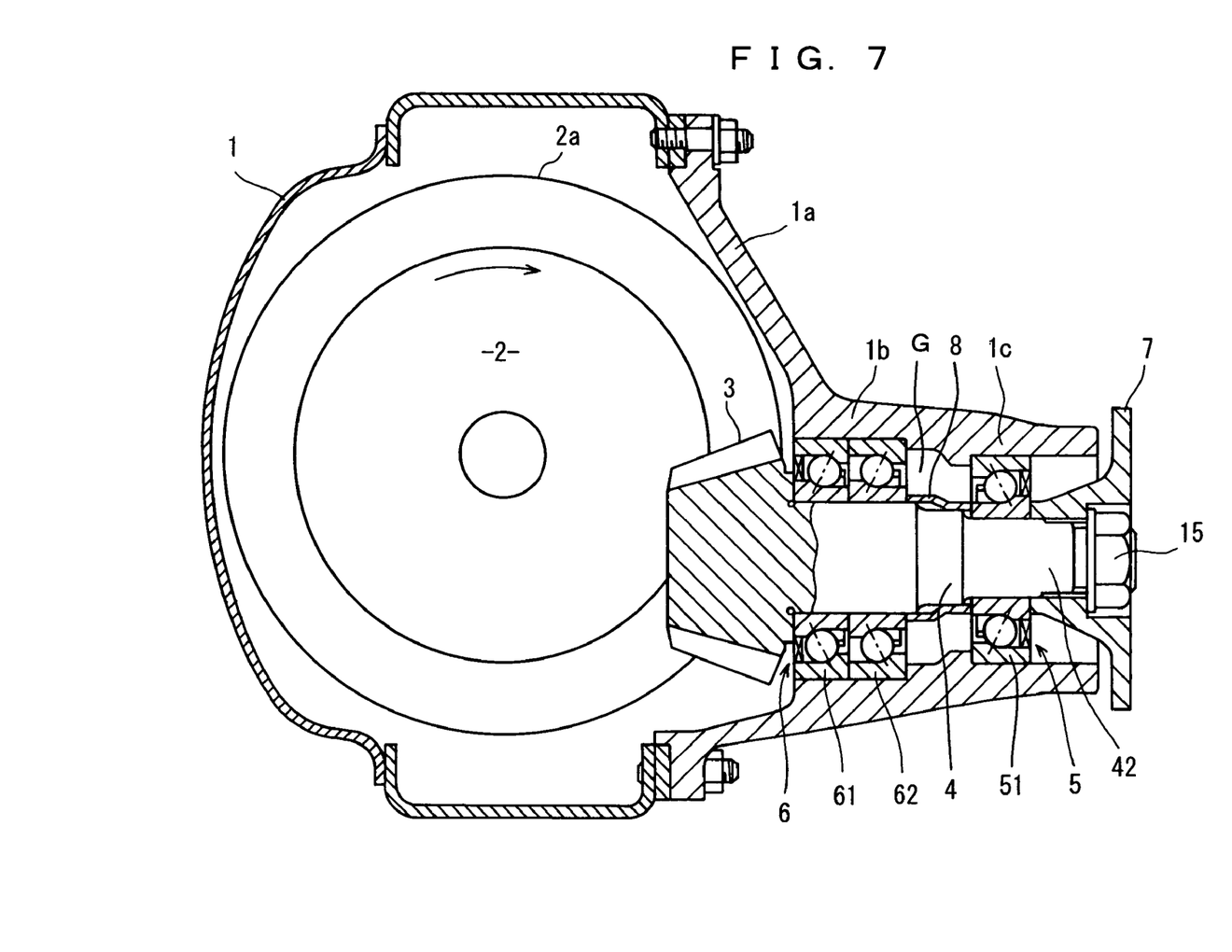
FIG. 7 is a sectional view of a differential device having a bearing device for supporting a pinion shaft adopted therein according to still another embodiment of the present invention.
Figure 8:
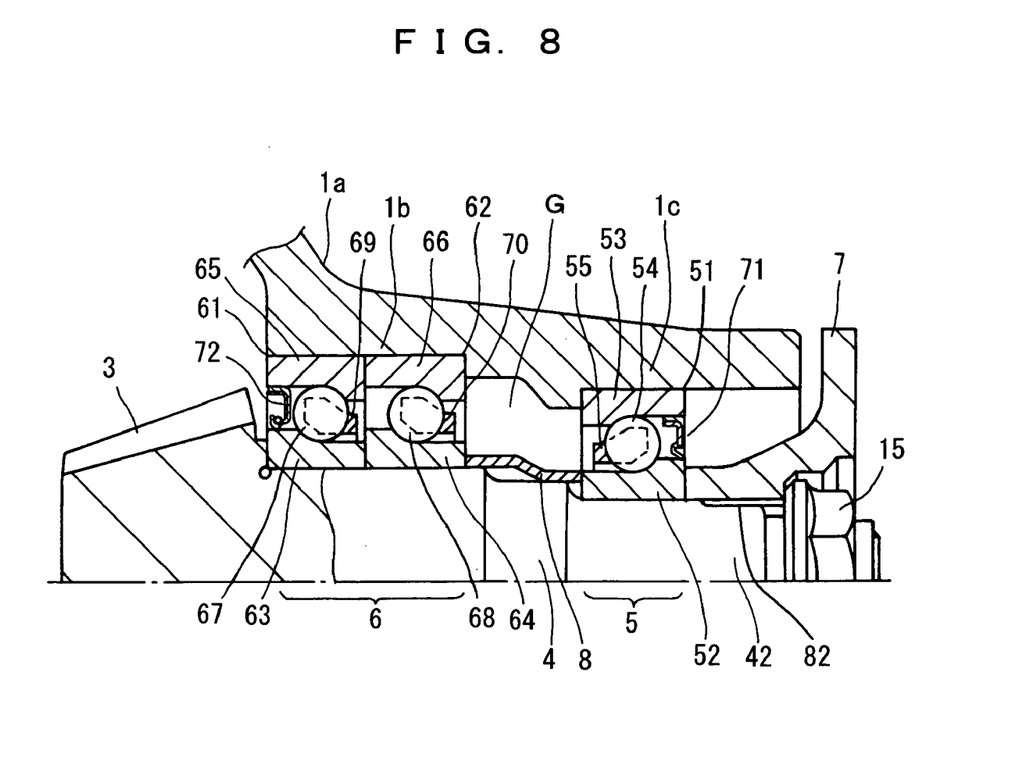
FIG. 8 is a partial sectional view of the bearing device for supporting a pinion shaft of FIG. 7.

4) Referring to FIGS. 7 and 8, still another embodiment of the present invention is hereinafter described. FIG. 7 is a sectional view of a differential device having a bearing device for supporting a pinion shaft adopted therein. FIG. 8 is a partial sectional view of a bearing device for supporting a pinion shaft.

1 is a differential case, and in the differential case 1 are housed a differential speed change mechanism 2 for differentially gearing right and left wheels, a pinion gear 3, a pinion shaft 4, first and second tilt-contact rolling bearings 5 and 6 for supporting the pinion shaft 4 so as to freely rotate, and the like. The pinion gear 3 is engaged with a ring gear 2a of the differential speed change mechanism 2 and is formed integral with the inner end portion of the pinion shaft 4.

The pinion shaft 4 is supported by the first and second tilt-contact rolling bearings 5 and 6 arranged axially in parallel so as to freely rotate with respect to the differential case 1 and is provided with, at the outer end portion thereof, a companion flange 7 serving as a connecting flange, with which a propeller shaft (not shown) is coupled.

The first tilt-contact rolling bearing 5 on the companion flange side is formed from a single row angular ball bearing 51. The pinion-gear-side second tilt-contact rolling bearing 6 is formed from double row angular ball bearings 61 and 62. The lines of action of the angular ball bearing 51 of the first tilt-contact rolling bearing 5 and the angular ball bearings 61 and 62 of the second tilt-contact rolling bearing 6 intersect with one another on an outer ring side, and the first and second tilt-contact rolling bearings 5 and 6 form the rolling bearing of rear-surface-coupling type.

The angular ball bearing 51 is comprised of an inner ring 52, an outer ring 53, and a group of balls 54 retained by a retainer 55, and the companion-flange-side end portions of the inner ring 52 and outer ring 53 are sealed with a seal member 71. The angular ball bearings 61 and 62 are respectively comprised of inner rings 63 and 64, outer rings 65 and 66 and groups of balls 67 and 68 retained by retainers 69 and 70. The pinion-gear-side end portions of the inner ring 63 and outer ring 65 are sealed with a seal member 72.

The angular ball bearings 61 and 62 forming the second tilt-contact rolling bearing 6 are provided in parallel and fitted outward to the pinion shaft 4. The pinion shaft 4 is inserted from the large-diameter-side opening portion of a bearing case portion 1a so that the outer rings 65 and 66 are fixedly pressure-fitted to an annular wall 1b. The first tilt-contact rolling bearing 5 is fitted outward to the pinion shaft 4 from a drive shaft side via a spacer 8 provided between itself and the second tilt-contact rolling bearing 6, and the outer ring 53 is fixedly pressure-fitted to an annular wall 1c.

A grease G infills between the seal members 71 and 72 on both of the axial ends, that is a sealed space between the respective inner and outer rings of the first and second tilt-contact rolling bearings 5 and 6 and a sealed space between the bearing case portion 1a and the pinion shaft 4 and between the first and second tilt-contact rolling bearings 5 and 6.

Further, the companion flange 7 is spline-fitted to a drive-shaft-side small diameter portion 42 of the pinion shaft 4, and a nut 15 is fastened into the companion flange 7. Thus, the first and second tilt-contact rolling bearings 5 and 6 disposed in parallel via the spacer 8 are sandwiched between the pinion gear 3 and the companion flange 7, and thereby preloaded and fixed to the pinion shaft 4.

The seal member 71 is formed in the manner similar to the seal member 37 shown in FIG. 3A. The seal member 72 is formed in the manner similar to the seal member 38 shown in FIG. 3B. The grease exemplified in the embodiment of the present invention describing FIGS. 1 through 3, or the like, is used as the grease G.

In the described manner, the pinion shaft 4, subject to axial and radial loads by the first and second tilt-contact rolling bearings 5 and 6, is supported so as to freely rotate with respect to the differential case 1.

In the bearing device for supporting a pinion shaft of this embodiment, the angular ball bearings 61 and 62 of small frictional resistance are used for the second tilt-contact rolling bearing 6 which a large thrust load acts on, wherein a running torque is reduced compared to the case of a tapered roller bearing resulting in an improved efficiency of the differential device. Besides, the running torque is further reduced by the angular ball bearing 51 of small frictional resistance used for the first tilt-contact rolling bearing 5. The load capacity is increased because of the double row angular ball bearings 61 and 62 used for the second tilt-contact rolling bearing 6 which a large thrust load acts on. Thus, a sufficient supporting rigidity is successfully obtained despite the ball bearing.

As other advantages, the bearing device for supporting a pinion shaft requires grease for lubrication, which suppresses the increase of the torque due to resistance caused by agitated oil; it is unnecessary to provide oil introducing and oil reflux paths in the differential case 1, which reduces the differential case 1 in size and weight; and the bearing device is free of any impact from foreign matter in oil in the differential case 1 because of grease lubrication. The life of the bearing device is therefore improved, and no maintenance is required.

Furthermore, a sealed space, which is infilled with the grease G, is formed not only between the respective inner and outer rings of the first and second tilt-contact rolling bearings 5 and 6 but also between the bearing case 1a and the pinion shaft 4 and the first and second tilt-contact rolling bearings 5 and 6. Thus, a sufficient amount of the grease G is contained to lubricate the bearing.

A single row angular ball bearing may be used for the second tilt-contact bearing 6.

Figure 9:
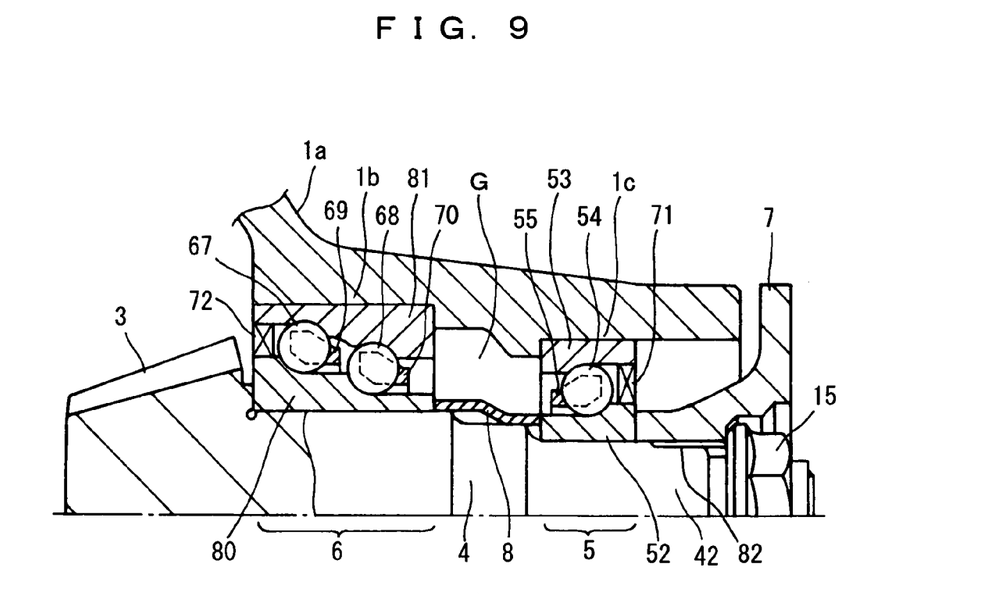
FIG. 9 is a partial sectional view of a bearing device for supporting a pinion shaft in a differential device according to still another embodiment of the present invention.

5) Referring to FIG. 9, still another embodiment of the present invention is hereinafter described. FIG. 9 shows a partial sectional view of a bearing device for supporting a pinion shaft adopted in a differential device. For any part identical to those in FIGS. 7 and 8, the same reference numerals are shown to omit explanations.

In the case of this embodiment, a tandem double row angular ball bearing is used for a second tilt-contact rolling bearing 6.

The second tilt-contact rolling bearing 6 is comprised of an inner ring 80, an outer ring 81, groups of balls 67 and 68 arranged in two rows and retained by retainers 69 and 70, wherein a space between the pinion-gear-side end portions of the inner ring 80 and outer ring 81 is sealed with a seal member 72. The pinion-gear-side group of balls 67 are disposed radially outward relative to the other group of balls 68 and formed in tandem structure.

In the bearing device for supporting a pinion shaft of this embodiment, the double row angular ball bearing of small frictional resistance is used for the second tilt-contact rolling bearing 6, and a running torque is thereby reduced to consequently improve the efficiency of the differential device. Moreover, grease is used for lubrication to thereby suppress the increase of the torque caused by resistance due to agitated oil. Hence, the differential device is reduced in size and weight to consequently improving the life of the bearing, and no maintenance is necessary. Further, because the tandem double row angular ball bearing is used for the second tilt-contact rolling bearing 6, the number of the pinion-gear-side group of balls 67 is increased, and a load capacity thereby becomes larger. Accordingly, a sufficient load capacity is obtained despite a smaller running torque, which improves the efficiency of the differential device.

Figure 10:
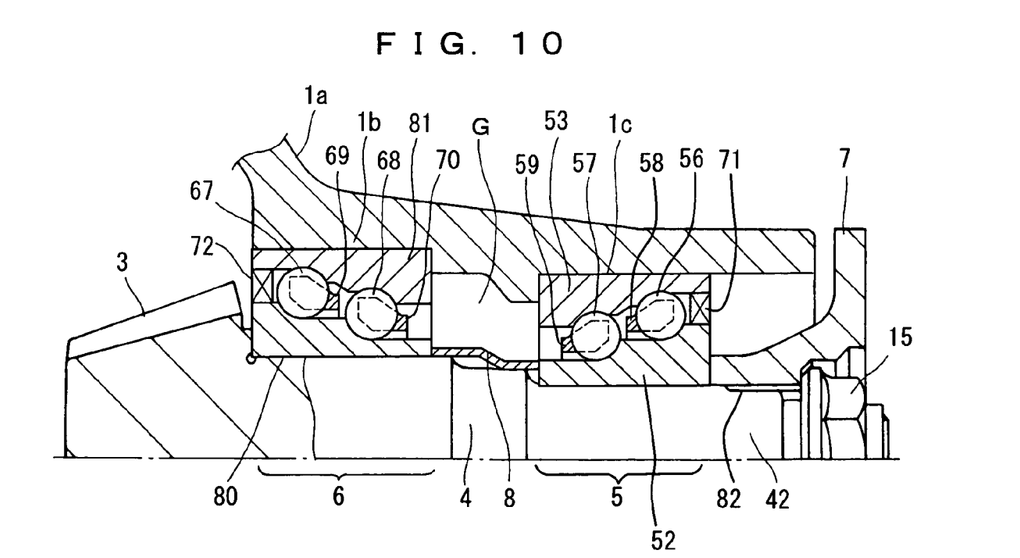
FIG. 10 is a partial sectional view of a modification example of the bearing device for supporting a pinion of FIG. 9.

FIG. 10 is a partial sectional view of a modification example of the bearing device for supporting a pinion according to this embodiment. In this modification example, a tandem double row angular ball bearing is used for a first tilt-contact rolling bearing 5. The first tilt-contact rolling bearing 5 is comprised of an inner ring 52, an outer ring 53, and groups of balls 56 and 57 arranged in two rows and retained by retainers 58 and 59, wherein a space between the companion-flange-side end portions of the inner ring 52 and outer ring 53 is sealed with a seal member 71. The companion-flange-side group of balls 56 are disposed radially outward relative to the other group of balls 57 and formed in tandem structure.

Figure 11:
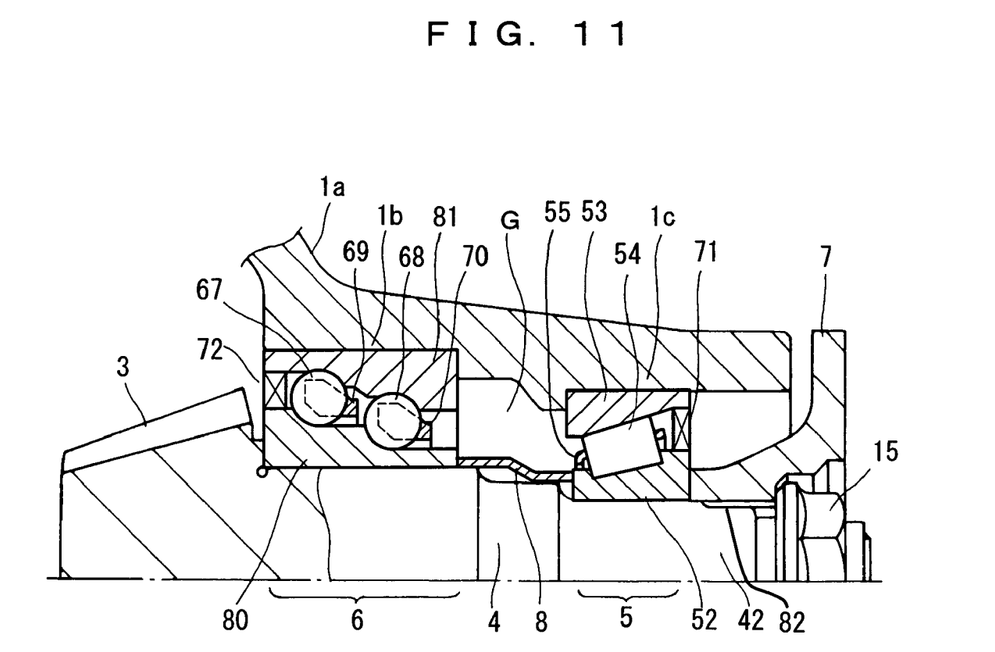
FIG. 11 is a partial sectional view of another modification example of the bearing device for supporting a pinion shaft of FIG. 9.

FIG. 11 is a partial sectional view of another modification example of the bearing device for supporting a pinion shaft of this embodiment. In this modification example, a single row tapered roller bearing is used for a first tilt-contact rolling bearing 5. The first tilt-contact rolling bearing 5 is comprised of an inner ring 52, an outer ring 53, a group of tapered rollers 54 and a retainer 55.

Because the tapered roller bearing is used for the first tilt-contact rolling bearing 5 as described, a preload is set more easily compared to the case of a ball bearing.

POSSIBILITY OF INDUSTRIAL APPLICATION

The bearing device for supporting a pinion shaft according to the present invention is suitable for supporting a pinion shaft which is installed in a differential device of an automobile, a four-wheel-drive transfer device, or the like, so as to freely rotate.

The invention claimed is:

1. A bearing device for supporting a pinion shaft having a pinion gear on a second shaft end thereof and a connecting flange on a first shaft end thereof so as to freely rotate with respect to a case, comprising:

a first tilt-contact rolling bearing provided on a first outer peripheral surface portion of the pinion shaft proximate said first shaft end thereof, and a second tilt-contact rolling bearing provided on a second outer peripheral surface portion of the pinion shaft proximate said second shaft end, wherein lines of action of the first and second tilt-contact rolling bearings intersect with one another on an outer diameter side, the first tilt-contact rolling bearing is comprised of an inner ring fixed to the pinion shaft, an outer ring fixed to the case, rolling bodies interposed between the inner and outer rings, said first tilt-contact rolling bearing being a double row bearing having said rolling bodies disposed in first and second first bearing raceways respectively situated at a flange side and a pinion gear side of the first tilt-contact rolling bearing, said first first bearing raceway having a greater diameter than said second first bearing raceway, said first tilt-contact rolling bearing has a first seal member sealing a connecting-flange-side end portion between the inner and outer rings of said first tilt-contact rolling bearing, and no seal member on an opposing side, the second tilt-contact rolling bearing constitutes an angular ball bearing formed from an inner ring fixed to the pinion shaft, an outer ring fixed to the case, a group of balls interposed between the inner and outer rings, said second tilt-contact rolling bearing being a double row bearing having said rolling bodies disposed in first and second bearing raceways respectively situated at a flange side and a pinion gear side of the second tilt-contact rolling bearing, said second second bearing raceway having a greater diameter than said first second bearing raceway, and said second tilt-contact rolling bearing has a second seal member sealing a pinion-gear-side end portion between the inner and outer rings of said second tilt-contact rolling bearing, and no seal member on an opposing side, a sealed space between the first and second seal members is infilled with grease, and the connecting flange is fastened in the pinion-gear direction preloading the first and second tilt-contact rolling bearings.

2. The bearing device according to claim 1, further comprising a spacer member disposed around said pinion shaft and abutting said inner rings of the first and second tilt-contact rolling bearings.

3. The bearing device according to claim 1, wherein said second first bearing raceway has a smaller diameter than said first second bearing raceway.

4. A bearing assembly disposed in a case, the bearing assembly rotatably supporting a pinion shaft, the pinion shaft including a connecting flange disposed at an axially inner end of the pinion shaft and a pinion gear disposed at an axially outer end of the pinion shaft, the bearing assembly comprising:

axially inner and axially outer tilt-contact rolling bearings, each bearing comprising a radially inner ring fixed to an outer peripheral surface portion of the pinion shaft, a radially outer ring fixed to the case, the radially inner ring and the radially outer ring defining axially inner and axially outer raceways adjacent one another, and a set of rolling bodies interposed between the rings and in the axially inner and axially outer raceways, the rolling bodies defining sets of axially inner and aider lines of action;

the axially inner raceway of the axially inner tilt-contact rolling bearing having a greater diameter than the axially outer raceway of axially inner tilt-contact rolling bearing;

the axially outer raceway of the axially outer tilt-contact rolling bearing having a greater diameter than the axially inner raceway of the axially outer tilt-contact rolling bearing;

each line of action of the axially inner set intersecting each line of action of the axially outer set at a location that is radially outward of said bearings;

said axially inner bearing having an axially inner seal member sealing an axially inner end-side of said axially inner bearing and no seal on an opposing side of said axially inner bearing;

said axially outer bearing having an axially outer seal member sealing an axially outer end-side of said axially outer bearing and no seal on an opposing side of said axially outer bearing;

said seal members being disposed between respective radially inner and outer rings of said inner and outer bearings;

said axially inner and outer seal members defining a sealed contiguous space from said axially inner seal member to said axially outer seal member for sealing therebetween said rolling bodies of said axially inner and outer bearings, said sealed space being filled with grease for lubricating said sealed plurality of rolling members; and the connecting flange being fastened in the pinion-gear direction preloading the axially inner and axially outer tilt-contact rolling bearings.

5. The bearing assembly of claim 4 wherein the axially outer bearing is an angular ball bearing.

6. The bearing device according to claim 4, wherein said axially outer raceway of said axially inner bearing has a smaller diameter than said axially inner raceway of said axially outer bearing.

* * * * *